Oct. 4, 1927.
G. KEINATH
1,644,340
OPTICAL PYROMETER
Filed Nov. 23, 1925
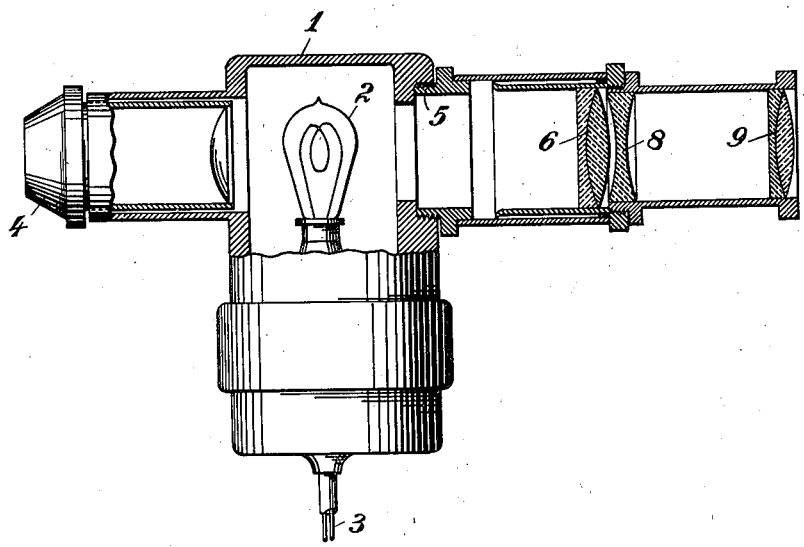
Inventor
Georg Keinath
by Knight Bro
attorneys Patented Oct. 4, 1927.

1,644,340

UNITED STATES PATENT OFFICE.

GEORG KEINATH, OF BERLIN-CHARLOTTENBURG, GERMANY, ASSIGNOR TO SIEMENS AND HALSKE, AKTIENGESELLSCHAFT, OF BERLIN, GERMANY, A GERMAN CORPORATION.

OPTICAL PYROMETER.

Application filed November 23, 1925, Serial No. 70,851, and in Germany May 29, 1925.

The present invention relates to improvements in optical pyrometers.

When operating with optical pyrometers the work is often hindered by the heat which radiates from the object which is to be controlled, f. inst. a furnace on account of the high temperature in the neighbourhood of the same. Another drawback is that it is often impossible to set up the pyrometer as near to the furnace as would be desirable, as the space near the furnace must be left free for the workers attending to the same. When however the pyrometer observations are taken from a distance of some meters and the object to be controlled is a relatively small one, f. inst. a slot in the furnace wall, it is very difficult and often impossible to take the necessary observations, because the image of the object which is visible in the pyrometer tube is of so small dimensions, that it is impossible to compare exactly the brightness of the area under observation with the brightness of the incandescent filament.
In order to make it possible to get accurate observations also under condition of the above named kind, the optical pyrometer according to the invention is equipped with a tele-objective, which in its simplest form consists of a positive lens and a negative lens. Such a lens will give an image in the pyrometer tube which is several times larger than the image obtained in simple objectives. The measuring error which will arise on account of the higher absorption at the double lens arrangement may if necessary be taken into regard at the calculation of the result without difficulty.

The tele-objective is preferably so constructed, that it may be used in the front of a usual pyrometer objective.

In the drawing accompanying this specification a diagrammatical sectional view of a constructional form of the invention is shown by way of example.

In the central part of the pyrometer 1 the comparison lamp 2 is arranged, which is fed through the wires 3. On the left side of the figure the eye piece 4 is located and on the right side at 5 a normal objective 6 is attached and preferably is made detachable. The lamp 2 may also be enclosed in an inner casing the open ends of which are covered with plane-parallel glass plates.

According to the invention a tele-objective can be mounted on the pyrometer. In the shown constructional form a concave lens 8 and a convex lens 9 are placed in front of the objective 6 whereby the characteristics of the lenses 8 and 9 are so chosen, that all lenses together form the tele-objective.

As the tele-objective and the eye piece may be made detachable it would of course also be possible to use the pyrometer for very exact measurements over short distances, simply by exchanging the tele-objective for a micro-objective and possibly exchanging the eye piece for an eye piece adapted to cooperate with the micro-objective.

Having now particularly described and ascertained the nature of my invention and in what manner the same is to be performed, I declare that what I claim is:—

1. In an optical pyrometer, a source of light, an exchangeable eye piece device, an exchangeable objective device and a tele-objective device adapted to be connected to the pyrometer and serving to make the same employable for measurements over relatively wide distances.

2. In an optical pyrometer, a source of light, an exchangeable eye piece device, an exchangeable objective device and an additional set of lenses, adapted to be connected to the objective device and together with this forming a tele-objective.

3. In an optical pyrometer, a source of light, a casing for the same, an eye piece connected to one end of the casing, an objective device connected to the other end of the casing, a sleeve adapted to be connected to a socket on the objective device and lenses in the said sleeve, adapted to cooperate with the objective device in making the pyrometer employable for measurements over relatively wide distances.

In testimony whereof I affix my signature.

GEORG KEINATH.